3,021,300
Patented Feb. 13, 1962

3,021,300
IMPROVED POLYSTYRENE COMPOSITION CONTAINING VULCANIZED BUTADIENE-STYRENE COPOLYMER RUBBER
Stanley Maurice Ardley, Penarth, Glamorgan, and James Arthur Jones, Twyncyn, Dinas Powis, Glamorgan, Wales, assignors to The Distillers Company Limited, Edinburgh, Scotland, a British company
No Drawing. Filed Jan. 13, 1956, Ser. No. 558,824
Claims priority, application Great Britain Jan. 20, 1955
4 Claims. (Cl. 260—45.5)

This invention relates to improved grades of polystyrene, particularly those characterised by greater impact strengths.

Polystyrene has many advantageous properties which make it a particularly valuable material from which to make various articles by the extrusion and injection moulding techniques. However, polystyrene is somewhat brittle and liable to fracture and for many purposes it would be advantageous to reinforce it and, in particular to increase its impact strength.

Various methods have been proposed to produce reinforced or toughened polystyrene which have comprised adding to the polystyrene a suitable reinforcing or toughening agent in such quantities that the resultant product is toughened and still retains those properties, for instance surface finish, of polystyrene which make it valuable for the production of plastic articles. In general it has been found that "toughened polystyrenes" of this type should not contain more than 20% by weight of the reinforcing agent and preferably not more than about 10% is used.

Various grades of natural rubber have been proposed as toughening agents for polystyrene in the preparation of the above type of "toughened polystyrenes." Such natural rubber has always been employed in the unvulcanised state as vulcanised natural rubber is not sufficiently compatible with polystyrene and consequently leads to the formation of compositions which are not homogeneous. Throughout this specification the word "homogeneous" is used in connection with "toughened polystyrenes" to describe those compositions obtained by dispersing a reinforcing agent throughout a sample of polystyrene in such a way that the separate particles of the reinforcing agent cannot be seen with the naked eye. It should be noted that when the reinforcing agent is a clear compound having approximately the same refractive index as polystyrene, it is necessary to employ a surface staining technique to mark either the dispersed agent or the polystyrene in order to ascertain whether the reinforced composition is homogeneous, i.e. whether the reinforcing agent is sufficiently finely dispersed throughout the polystyrene.

The surprising discovery has now been made that lightly vulcanised synthetic rubber copolymers can be dispersed in polystyrene to give homogeneous compositions which possess markedly improved physical characteristics, particularly with regard to their impact strength.

Accordingly the present invention provides a composition comprising a homogeneous mixture of polystyrene and not more than 20% by weight of the polystyrene of a lightly vulcanised butadiene-styrene synthetic rubber as hereinafter defined.

Any standard sample of polystyrene of the kind which is used for the manufacture of moulded or extruded articles can be used. The preferred polystyrene has an average molecular weight in the range 80,000 to 115,000 as determined by the viscosity method of Staudinger.

Butadiene-styrene synthetic rubbers of the type employed in the present invention are well known per se and as examples may be mentioned the synthetic rubbers known under the trade descriptions GR-S, Buna-S, Buton-S, Hycar O.S. Chemigum IV, Nubun, Polysar and Krylene. Such synthetic rubbers are prepared by the copolymerisation of from 50 to 80% by weight of butadiene with from 50 to 20% by weight of styrene. Mixtures of synthetic rubbers can be employed.

By the expression "lightly vulcanised butadiene-styrene synthetic rubber" is meant a vulcanised butadiene-styrene synthetic rubber which can be dispersed in poly-styrene to give a homogeneous product. If the vulcanisation has been carried too far, the vulcanised rubber is no longer dispersible in polystyrene to give products which appear homogeneous to the naked eye.

The vulcanisation of the butadiene-styrene synthetic rubber is carried out by means of any of the known vulcanising agents including accelerators and the like which can be dispersed in the rubber by milling them into the solid synthetic rubber or by mixing their aqueous dispersions with the synthetic rubber latex. Vulcanisation is then effected by suitable heat treatment. Vulcanising agents and accelerators which can be employed include piperidine pentamethylene dithiocarbamate, mercaptobenzothiazole, zinc diethyl dithiocarbamate, cyclohexylbenzthiazyl sulphenamide, sulphur, zinc oxide, zinc isopropyl xanthate, tetramethyl thiuram disulphide, diphenyl guanidine. It will usually be preferable to employ mixtures of vulcanising agents and accelerators in order to obtain the desired rate of reaction and suitable properties in the treated material. For example, if the organic vulcanising agent does not contain zinc, some zinc oxide is usually added.

The vulcanisation of the synthetic rubber is preferably carried out by masticating it on compounding rolls, adding the vulcanising agent or agents and then masticating on rolls at a higher temperature. Alternatively the vulcanising agents may be added in the form of an aqueous dispersion to the synthetic rubber latex which is then heated to effect the vulcanisation and the vulcanised product obtained by spray drying or precipitation from the latex. Where this latter procedure is adopted it may be convenient to add a quantity of a polystyrene-latex to the vulcanised latex prior to precipitation when the vulcanised synthetic rubber is obtained mixed with polystyrene and is thus in a form which is more readily handled.

It is preferred to carry out the vulcanisation of the butadiene-styrene synthetic rubber on compounding rolls because it has been found that by such methods the degree of vulcanisation of the rubber is readily controlled. For instance, if the vulcanisation has been carried on to too high a degree with the result that it is not possible to form homogeneous compositions according to the present invention, the rolling of the vulcanised synthetic rubber is continued and the shearing action to which the rubber is subjected in between the rolls appears to break down some of the cross linking formed in the vulcanisation with the result that a suitable lightly vulcanised product is obtained.

The degree of vulcanisation of a vulcanised butadiene-styrene synthetic rubber is conveniently followed by determining the "Mooney number," the "swelling index" or the "gel content" of the rubber. For any particular synthetic rubber it is possible to determine a range of values for these characteristics of the vulcanised rubber which give particularly valuable compositions according to the present invention. For instance, preferred compositions according to the present invention, contain vulcanised rubbers having Mooney numbers lying between 40 and 125, and particularly between 50 and 70. Similarly valuable compositions are obtained from vulcanised rubbers having gel contents between 55 and 75% by weight.

The Mooney number of a vulcanised synthetic rubber is determined by means of a Mooney plastometer which is a well known instrument in the rubber industry. The gel content and swelling index of a vulcanised synthetic rubber is determined by the following procedure: a small sample of the rubber is suspended in a weighed basket in 150 millilitres of benzene for at least 36 hours at room temperature. The basket is then taken out of the benzene and excess benzene removed with filter paper, and the basket and contents weighed rapidly to the nearest 0.01 gram. From this weighing the weight of the wet gel (W1) is obtained. The basket and contents are then placed in an oven at 40–50° C. under a pressure of 2 millimetres of mercury and the absorbed benzene removed. The basket and residue are then reweighed and the weight of the dry gel (W2) is calculated.

If $Wr$ = weight of rubber
$W1$ = weight of wet gel and
$W2$ = weight of dry gel $$\text{Percent gel content} = \frac{W2}{Wr} \times 100$$

and $$\text{Swelling index} = \frac{W1 - Wr}{Wr}$$

The polystyrene employed in conjunction with the vulcanised synthetic rubber is prepared by any known process which leads to the production of a material suitable for use as a moulding powder; such processes include bulk polymerisation in the presence or absence of catalysts, emulsion polymerisation and suspension polymerisation.

The compositions of the present invention may contain up to 20% by weight of the lightly vulcanised synthetic rubber on the weight of the polystyrene present.

The preferred proportion of vulcanised synthetic rubber to be employed is from 1–15% by weight on the polystyrene employed. It will be understood that if a quantity of a polystyrene latex is added to the vulcanised synthetic rubber latex, the quantity of polystyrene which is added on the mill will be reduced by a corresponding amount. In addition, other materials such as plasticisers, mould release agents, antistatic agents, antioxidants and other similar materials commonly present in polystyrene compositions can be added up to a total of about 10% by weight on the polystyrene/synthetic rubber composition.

The incorporation of the vulcanised synthetic rubber in the polystyrene is carried out according to known methods, e.g. by use of an extruder mixer or, preferably, by mastication of the mixture on hot rolls. The product may then be sheeted, cooled and broken up in the usual way to produce the compositions of the present invention in a suitable form for moulding, extrusion and the like. The preferred procedure comprises compounding the vulcanised synthetic rubber with the polystyrene at a temperature which is high enough to soften and permit easy working of the polystyrene, but not so high as to cause thermal degradation of the polystyrene, oxidative darkening of the rubber or poor mixing. Temperatures between 130° C. and 190° C. are suitable.

If desired the butadiene-styrene synthetic rubber can be lightly vulcanised with the aid of vulcanising agents such as those described above after or while compounding the synthetic rubber with the polystyrene. The essential ingredients in the preparation of compositions according to the present invention by this technique are the polystyrene, the butadiene-styrene synthetic rubber and the vulcanising agent, and they can be compounded in any order, preferably on heated rolls which bring about the desired degree of vulcanisation of the synthetic rubber.

The following examples illustrate the preparation of lightly vulcanised butadiene-styrene synthetic rubbers and the preparation therefrom of improved grades of polystyrene. The reinforced polystyrene compositions produced were tested in the usual manner for elongation at break and impact strength (Charpy); the results being expressed as a percentage and in ergs per square centimetre respectively.

EXAMPLES 1 TO 4

In these examples the butadiene-styrene synthetic rubber used is that sold under the trade name "Krylene" and contains approximately 70% by weight of polymerised butadiene. The rubber was mixed for five minutes with 3% by weight of tetramethyl thiuram disulphide and ½% by weight of zinc diethyl-dithiocarbamate by cold mastication at about 40° C. Portions of this mixture were then heat treated by hot milling at 150° C. for varying times to bring about the light vulcanisation and then the product was used to toughen polystyrene in the following formulation:

| | Parts by weight |
|---|---|
| Polystyrene | 90 |
| Heat-treated synthetic rubber | 10 |
| Liquid paraffin | 0.9 |

The degree of vulcanisation of the synthetic rubber was followed by measuring its "swelling index" and "gel content" and "Mooney number" as hereinbefore described. The results obtained are shown in Table 1.

Table 1

| Example No. | Time of heat treatment (Mins.) | Rubber Properties ||| Properties of the toughened polystyrene ||
|---|---|---|---|---|---|---|
| | | Mooney No. | Swelling Index | Gel Content, Percent | Elongation | Impact |
| 1 | 7½ | 109.5 | 20.12 | 60 | 13.7 | 4.1 |
| 2 | 10 | 117.0 | 18.8 | 65 | 17.0 | 4.5 |
| 3 | 12½ | 118 | 19.27 | 64 | 10.1 | 4.32 |
| 4 | 15 | 120 | 18.6 | 67 | 16.0 | 4.2 |

Comparative examples using unvulcanised "Krylene" ("swelling index" greater than 25) and the same procedure, i.e. the rubber was milled in the absence of the vulcanizing agents, gave the following results.

| Time of heat treatment (Mins.) | Properties of the toughened polystyrene ||
|---|---|---|
| | Elongation | Impact |
| 10 | 8.1 | 2.84 |
| 15 | 10.7 | 3.12 |

EXAMPLES 5 TO 9

In these examples the same procedure as described in Examples 1 to 4 was carried out but the "Krylene" synthetic rubber was replaced with a different butadiene/styrene synthetic rubber sold under the trade name "Buna SS." This rubber contained approximately 55% by weight of polymerised butadiene. The results obtained are given in Table 2.

Table 2

| Example No. | Time of heat treatment (Mins.) | Rubber Properties | | | Properties of the toughened polystyrene | |
|---|---|---|---|---|---|---|
| | | Mooney No. | Swelling Index | Gel Content, Percent | Elongation | Impact |
| 5 | 5 | 76 | 14.22 | 57 | 7.2 | 7.4 |
| 6 | 7½ | 111 | 12.7 | 62 | 11.4 | 4.8 |
| 7 | 10 | 113 | 11.18 | 64 | 10.4 | 5.1 |
| 8 | 12½ | 118 | 12.19 | 67 | 10.1 | 5.42 |
| 9 | 15 | 117 | 10.62 | 66 | 14.6 | 4.97 |

Comparative examples using unvulcanised "Buna SS" (swelling index greater than 15) and the same procedure gave the following results:

| Time of heat treatment (Mins.) | Properties of the toughened polystyrene | |
|---|---|---|
| | Elongation | Impact |
| 5 | 7.6 | 3.1 |
| 10 | 9.5 | 4.15 |
| 15 | 6.5 | 3.69 |

EXAMPLES 10 TO 12

In these examples portions of a butadiene-styrene synthetic rubber sold under the trade name "Polysar S50" were milled with varying amounts of vulcanising agents on cold rolls for 10 minutes and then vulcanised by being heated on the rolls at 150° C. for 5 minutes. The vulcanised rubbers were used to reinforce polystyrene in the following formulation:

|  | Parts by weight |
|---|---|
| Polystyrene | 90 |
| Vulcanised rubber | 10 |
| Liquid paraffin | 2 |

The results obtained are shown in Table 3.

Table 3

| Example | Vulcanising agents | | Properties of toughened polystyrene | | |
|---|---|---|---|---|---|
| | T.M.T. | Z.D.C. | Gel content of rubber, percent | Elongation | Impact |
| 10 | 3 | ½ | 68 | 17.1 | 5.5 |
| 11 | 2 | ½ | 15 | 7.8 | 3.2 |
| 12 | 1 | ½ | 10 | 7.0 | 3.8 |

T.M.T. stands for tetramethyl-thiuram disulphide and Z.D.C. stands for zinc diethyl dithiocarbamate.

EXAMPLES 13 TO 15

Example 10 was repeated but the liquid paraffin in the final composition was omitted or replaced with the same quantity of other lubricants. The results obtained are shown in Table 4.

Table 4

| Example | Lubricant | Elongation | Impact |
|---|---|---|---|
| 13 | None | 2.7 | 4.7 |
| 14 | Stearine | 5.8 | 3.9 |
| 15 | Dibutylphthalate | 3.8 | 5.8 |

EXAMPLES 16 AND 17

In the following examples the polystyrene was milled with 3 parts by weight of tetramethyl-thiuram disulphide and ½ part by weight of zinc diethyl-dithiocarbamate at 150° C. and as soon as a uniform dispersion was obtained, two different butadiene-styrene synthetic rubbers were added and the mixture was milled for a further five minutes. The ingredients were:

|  | Parts by weight |
|---|---|
| Polystyrene | 90 |
| Rubber | 10 |
| Liquid paraffin | 0.9 |

The results obtained are shown in Table 5.

Table 5

| Example | Synthetic rubber | Gel Content of rubber,[1] percent | Elongation | Impact |
|---|---|---|---|---|
| 16 | Polysar S50 | 65 | 8.2 | 6.7 |
| 17 | Buna SS | 60 | 7.4 | 4.9 |

[1] The gel content of the rubbers was estimated by carrying out similar vulcanisation in the absence of the polystyrene.

Similar results were also obtained by adding the synthetic rubber to the mill and then adding a premixed composition of polystyrene and vulcanising agent as shown in the following examples.

EXAMPLES 18 AND 19

Examples 16 and 17 were repeated but the synthetic rubber was first added to the mill and then the premixed composition of polystyrene and vulcanising agents was added. The results are shown in Table 6.

Table 6

| Example | Rubber | Elongation | Impact |
|---|---|---|---|
| 18 | Polysar S50 | 7.7 | 4.4 |
| 19 | Buna SS | 7.2 | 4.9 |

In all the previous examples the polystyrene used had an average molecular weight in the range 85,000 to 100,000 and had an elongation at break of 2% and an impact strength of $2.5 \times 10^{-6}$ ergs/cm.$^2$.

EXAMPLE 20

100 parts of a GRS type synthetic rubber, Polysar S50, containing 30% styrene and 70% butadiene were masticated on compounding rolls at 60° C. and 3 parts by weight of tetramethyl thiuram disulphide and 0.5 part of zinc diethyl dithiocarbamate added. After milling for 5 minutes, the rubber was removed and masticated for a further 5 minutes on rolls at 150° C.

This lightly vulcanized rubber was then incorporated with polystyrene by milling 10 parts with 90 parts of polystyrene of average molecular weight 90,000–100,000 and 2 parts of liquid paraffin for 5 minutes at 150° C. The material was removed as a sheet, flattened, cut into strips and test pieces, compression moulded from the strips, were tested in the usual way and gave the following results:

Elongation _____ percent __ 16
Impact strength _____ $6.1 \times 10^6$

EXAMPLE 21

A similar grade of a GRS type synthetic rubber to that employed in Example 20 was treated in the same way except that it was milled with the vulcanising agents for 10 minutes at 60° C. prior to heating to 150° C. The final polystyrene composition possessed the following characteristics:

Elongation _____ percent __ 13.1
Impact strength _____ $4.5 \times 10^6$

We claim:
1. A composition comprising a homogeneous mixture of polystyrene having an elongation at break of 2% and an impact strength of $2.5 \times 10^{-6}$ ergs/cm.$^2$ and from 1% to 20%, by weight of the polystyrene, of a rubbery bu- tadiene-styrene synthetic copolymer containing 50% to 80% copolymerised butadiene and having its Mooney number raised from an initially lower value to a value between 40 and 125 by reaction with a sulfur-containing vulcanising agent, and having a gel content between 55% and 75% by weight, which synthetic copolymer can be dispersed in the polystyrene to give a homogeneous product and said composition having a percentage elongation at break and an impact strength greater than polystyrene.

2. A composition as claimed in claim 1, wherein the polystyrene has a molecular weight in the range 80,000 to 115,000 as determined by the viscosity method of Staudinger.

3. A composition as claimed in claim 1, wherein the rubbery butadiene-styrene synthetic copolymer has a Mooney number between 50 and 70 after its reaction with the sulfur-containing vulcanizing agent.

4. A composition as claimed in claim 1, wherein the rubbery butadiene-styrene synthetic copolymer is employed in a proportion of from 1% to 15% by weight on the polystyrene employed.

References Cited in the file of this patent

UNITED STATES PATENTS

| | | |
|---|---|---|
| 2,578,518 | Ditz et al. | Dec. 11, 1951 |
| 2,727,878 | Ballman et al. | Dec. 20, 1955 |
| 2,808,386 | D'Alelio | Oct. 1, 1957 |
| 2,863,849 | Fordham | Dec. 9, 1958 |